US011189279B2

(12) United States Patent
Trufinescu et al.

(10) Patent No.: US 11,189,279 B2
(45) Date of Patent: Nov. 30, 2021

(54) ACTIVATION MANAGEMENT FOR MULTIPLE VOICE ASSISTANTS

(71) Applicant: Microsoft Technology Licensing, LLC, Redmond, WA (US)

(72) Inventors: Adina Magdalena Trufinescu, Redmond, WA (US); Alice Jane Bernheim Brush, Bellevue, WA (US); Kevin J. Endres, Carnation, WA (US); Lisa J. Stifelman, Palo Alto, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 111 days.

(21) Appl. No.: 16/419,503

(22) Filed: May 22, 2019

(65) Prior Publication Data

US 2020/0372907 A1    Nov. 26, 2020

(51) Int. Cl.
  *G10L 15/22*    (2006.01)
  *G10L 15/08*    (2006.01)
  *G10L 15/32*    (2013.01)

(52) U.S. Cl.
  CPC .............. *G10L 15/22* (2013.01); *G10L 15/08* (2013.01); *G10L 15/32* (2013.01); *G10L 2015/088* (2013.01); *G10L 2015/223* (2013.01)

(58) Field of Classification Search
  USPC .................... 704/246, 247, 251, 252, 275
  See application file for complete search history.

(56) References Cited

U.S. PATENT DOCUMENTS

| | | | |
|---|---|---|---|
| 2007/0143115 A1* | 6/2007 | Falcon | G10L 15/22 704/270.1 |
| 2018/0204569 A1 | 7/2018 | Nadkar et al. | |
| 2019/0013019 A1 | 1/2019 | Lawrence | |
| 2019/0130898 A1* | 5/2019 | Tzirkel-Hancock | G06F 3/167 |
| 2019/0206412 A1* | 7/2019 | Li | G10L 17/00 |
| 2020/0075018 A1* | 3/2020 | Chen | G10L 15/32 |
| 2020/0104093 A1* | 4/2020 | Kotteri | G06F 40/289 |
| 2020/0258512 A1* | 8/2020 | Smith | H04R 1/406 |

FOREIGN PATENT DOCUMENTS

| | | |
|---|---|---|
| CN | 107919123 A | 4/2018 |
| EP | 3389044 A1 | 10/2018 |

OTHER PUBLICATIONS

"International Search Report Issued in PCT Application No. PCT/US20/025066", dated Jul. 6, 2020, 16 Pages.

* cited by examiner

Primary Examiner — Leonard Saint Cyr
(74) Attorney, Agent, or Firm — Buckley, Maschoff & Talwalkar LLC

(57) ABSTRACT

A system and method include detection of a user utterance of one of plurality of voice keywords, each of the plurality of voice keywords associated with a respective voice assistant application, determination, in response to the detection of the one of the plurality of respective voice keywords, of whether any of the plurality of voice assistant applications are designated as uninterruptable, and, if it is determined that none of the plurality of voice assistant applications are designated as uninterruptable, activation of the one of the plurality of voice assistant applications associated with the detected keyword.

6 Claims, 11 Drawing Sheets

ACTIVATION MANAGEMENT FOR MULTIPLE VOICE ASSISTANTS

BACKGROUND

Voice assistants are fast becoming ubiquitous in modern computing devices. A user may interact with a voice assistant to control functionality of a computing device. When the computing device receives and recognizes a voice keyword associated with a voice assistant, the voice assistant is activated and launched to engage the user in a voice-driven computing experience.

Various computing platforms provide their own respective voice assistants. Each voice assistant is activated in response to a dedicated keyword, which may consist of one or more words. For example, on the Windows operating system, the voice assistant Cortana is activated with the keyword "Hey Cortana", on Google devices the voice assistant is activated with the keyword "OK Google", and on Amazon devices the voice assistant is activated with the keyword "Alexa".

A computing platform may be configured to support more than one voice assistant. Such a computing platform must therefore be capable of detecting and acting in response to each keyword of each supported voice assistant. Moreover, the system must manage activation in cases where keywords for one or more assistants are received while one of the voice assistants is active. Systems to efficiently address difficulties in the management of voice assistant activation on a multi-assistant platform are desired.

DETAILED DESCRIPTION

The following description is provided to enable any person in the art to make and use the described embodiments. Various modifications, however, will remain apparent to those in the art.

Some embodiments described herein provide a technical solution to the technical problem of managing activation of multiple voice assistants provided by a single computing platform. According to some embodiments, only one voice assistant is active at a given time. If the voice keyword of another voice assistant is detected while a voice assistant is active, the other voice assistant is not activated and the active voice assistant is not interrupted.

Some embodiments thereby protect the user experience from random activation of due to ambient noise or due to detection of a keyword that is being used in the conversation with the current assistant. In the latter regard, an example is considered in which a user says "Hey Cortana, remind me to call my wife Alexa". According to some embodiments, the keyword "Hey Cortana" causes activation of the Cortana voice assistant and the keyword Alexa does not cause activation of the Alexa voice assistant. Details of several alternative implementations are provided below.

Figure 1:
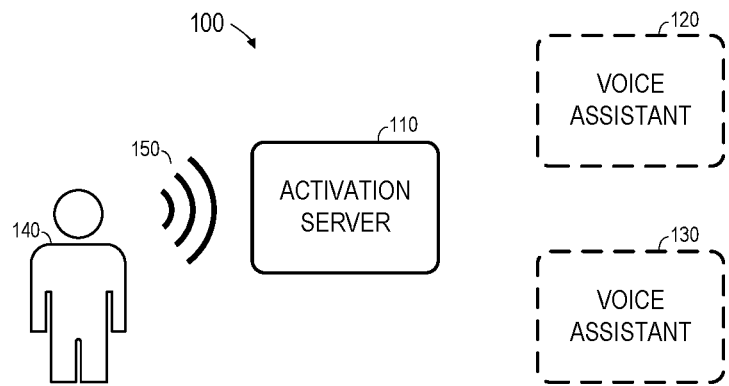
FIG. 1 is a block diagram of a multi-assistant platform during operation according to some embodiments.

FIG. 1 is a block diagram of multi-assistant platform 100 during operation according to some embodiments. Platform 100 consists of activation server 110, voice assistant 120 and voice assistant 130. Generally, user 140 utters keyword 150, and activation server 110 detects keyword 150 and activates one of voice assistant 120 and voice assistant 130 based on keyword 150 and on logic as described herein.

Platform 100 may be implemented by any suitable computing device or devices. In some embodiments, platform 100 is a personal computer executing an operating system of which activation server 110 is a component. Voice assistant 120 and voice assistant 130 may comprise applications compatible with the operating system and capable of communicating with activation server 110 via various application programing interfaces (APIs). Each component described herein may be implemented by executable code.

As will be described below, platform 100 may be implemented in other devices executing an operating system, such as a smartphone or a smart speaker. One or more of activation server 110, voice assistant 120 and voice assistant 130 may be located remote from other components of platform 100, for example in a cloud-based deployment.

One or more of activation server 110, voice assistant 120 and voice assistant 130 may be implemented in device firmware. Two or more of activation server 110, voice assistant 120 and voice assistant 130 may be provided by different software vendors.

The dotted lines of FIG. 1 indicate that voice assistant 120 and voice assistant 130 are, in the present example, initially inactive upon utterance of keyword 150 by user 140. For purposes of the present example, keyword 150 is a voice activation keyword associated with voice assistant 120. According to some embodiments, audio signals representing keyword 150 are received by an audio input device (e.g., a microphone) of platform 110 and other components of platform 110 process the audio signals to identify keyword 150, determine that keyword 150 is associated with voice assistant 120, and transmit a corresponding message to activation server 110. In some embodiments, the other components process the audio signals to identify keyword 150 and to determine that keyword 150 is associated with a registered voice assistant, and pass keyword 150 to activation server 110. Activation server 110 then determines that keyword 150 is associated with voice assistant 120.

As mentioned above, each of voice assistant 120 and voice assistant 130 may be associated with a respective dedicated keyword, and a "keyword" may consist of one or more words. In some embodiments, one or both of voice assistant 120 and voice assistant 130 may be associated with more than one respective keyword, each of which may include more than one words. Some embodiments are contemplated in which two or more voice assistants share a same keyword or keywords.

Figure 2:
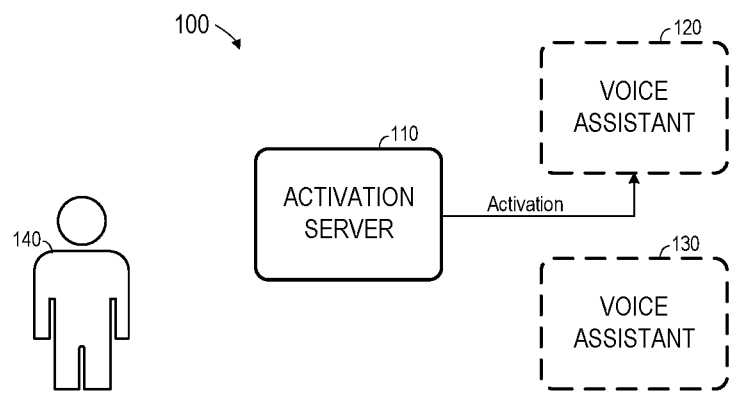
FIG. 2 is a block diagram of a multi-assistant platform during operation according to some embodiments.

Regardless of how activation server 110 determines that a voice keyword of voice assistant 120 has been received, activation server 110 transmits an activation signal to voice assistant 120 as shown in FIG. 2. The subsequent activation of voice assistant 120 is represented using a bold solid line. As will be described below, voice assistant 120 may perform a second check of the received audio signals prior to activation to confirm that keyword 150 was received (i.e., that the received audio signals represent keyword 150).

Figure 3:
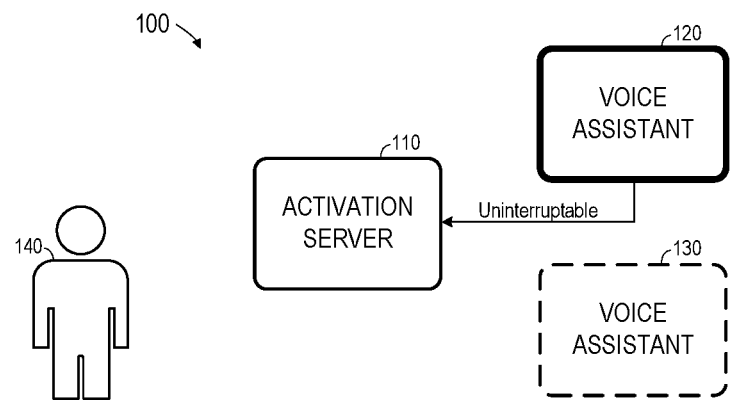
FIG. 3 is a block diagram of a multi-assistant platform during operation according to some embodiments.

As depicted in FIG. 3, active voice assistant 120 may send a signal (e.g., using an API exposed by activation server 110), that voice assistant 120 is uninterruptable. Activation server 110 therefore sets a flag or stores other data indicating that voice assistant 120 is uninterruptable.

Figure 4:
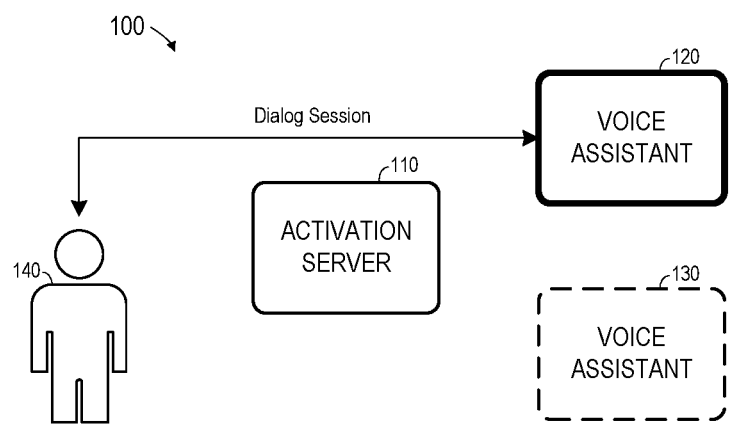
FIG. 4 is a block diagram of a multi-assistant platform during operation according to some embodiments.

A dialog session is then conducted between active voice assistant 120 and user 140 as is known in the art. FIG. 4 illustrates such a dialog session as transpiring directly between user 140 and voice assistant 120 for simplicity, but several hardware and software components may typically facilitate the dialog session according to known systems. In some examples, the dialog session may require voice assistant 120 to access other components of platform 100 (e.g., "Set an alarm for 6 am."), and/or an external service (e.g., "What is today's weather forecast?"), the details of which are omitted herein for the sake clarity.

Figure 5:
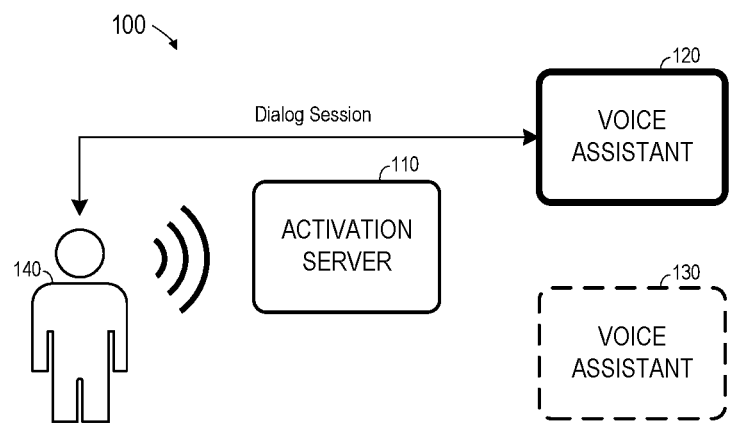
FIG. 5 is a block diagram of a multi-assistant platform during operation according to some embodiments.

FIG. 5 shows utterance of keyword 160 by user 140 during an ongoing dialog session with active voice assistant 120. For example, assuming that voice assistant 120 is associated with the keyword "Hey Cortana" and voice assistant 130 is associated with the keyword "Alexa", FIGS. 1-5 may depict operation of platform 100 during the utterance "Hey Cortana, call my wife Alexa".

Figure 6:
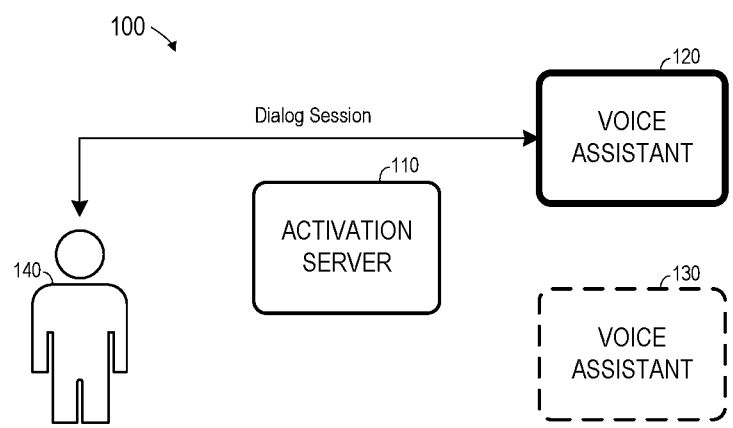
FIG. 6 is a block diagram of a multi-assistant platform during operation according to some embodiments.

As shown in FIG. 6, voice assistant 120 remains active and in a dialog session with user 140 even after reception of keyword 160 associated with voice assistant 130. As will be described in detail below, in some embodiments the utterance of keyword 160 causes activation server 110 to receive an indication of keyword 160. In response, activation server 110 determines that voice assistant 120 is active and has been marked as uninterruptable. Accordingly, activation server 110 does not send an activation signal to voice assistant 130, even though platform 100 received and detected keyword 160 associated with voice assistant 130.

Figure 7:
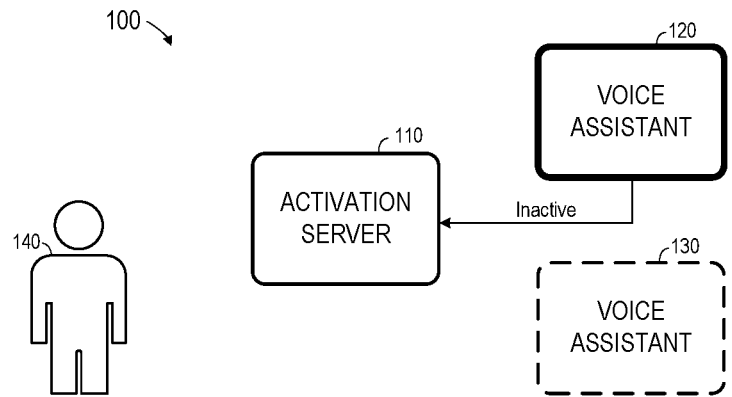
FIG. 7 is a block diagram of a multi-assistant platform during operation according to some embodiments.

FIG. 7 depicts termination of the dialog session between user 140 and voice assistant 120. Specifically, voice assistant 120 transmits a signal to activation server 110 indicating that voice assistant 120 is going inactive. In some embodiments, upon entering a final speaking state of a session, voice assistant 120 sends a signal to activation server indicating that voice assistant 120 is no longer uninterruptable (e.g., an "interruptable" signal), and then goes inactive as depicted in FIG. 7. Such an embodiment allows activation of another voice assistant before voice assistant 120 goes inactive.

Figure 8:
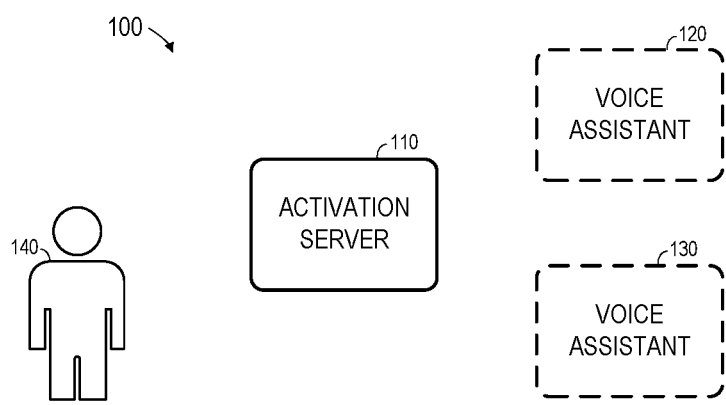
FIG. 8 is a block diagram of a multi-assistant platform during operation according to some embodiments.

FIG. 8 depicts a state of platform 100 after voice assistant 120 indicates its inactivity to activation server 110. Voice assistant 120 and voice assistant 130 are inactive and no dialog session with user 140 is in progress.

Figure 9:
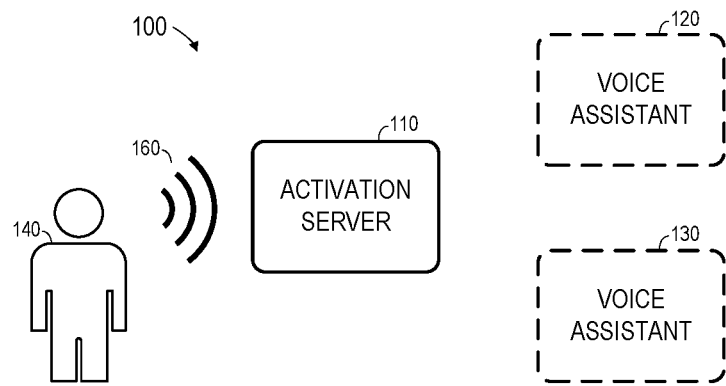
FIG. 9 is a block diagram of a multi-assistant platform during operation according to some embodiments.

It is now assumed that user 140 utters keyword 160 as shown in FIG. 9, and that keyword 160 is a voice activation keyword associated with voice assistant 130. Again, audio signals representing keyword 160 may be received by an audio input device of platform 110 and other unshown components of platform 110 may process the audio signals to identify keyword 160, determine that keyword 160 is associated with voice assistant 130, and transmit a corresponding message to activation server 110. Alternatively, other components process the audio signals to identify keyword 160, to determine that keyword 160 is associated with a registered voice assistant, and to pass keyword 160 to activation server 110. Activation server 110 then determines that received keyword 160 is associated with voice assistant 130.

Figure 10:
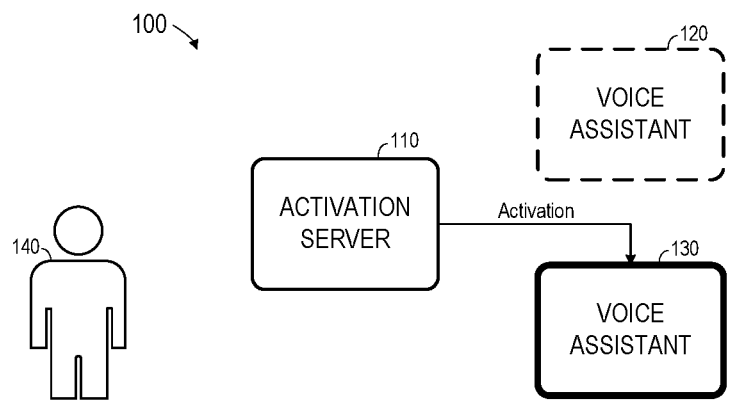
FIG. 10 is a block diagram of a multi-assistant platform during operation according to some embodiments.

In response to the determination that the voice keyword of voice assistant 160 has been received, activation server 110 transmits an activation signal to voice assistant 130 120 as shown in FIG. 10. Voice assistant 130 receives the activation signal and activates in response. Voice assistant 130 may also perform a second check of the received audio signals prior to activation to confirm that the received audio signals represent keyword 160.

Figure 11:
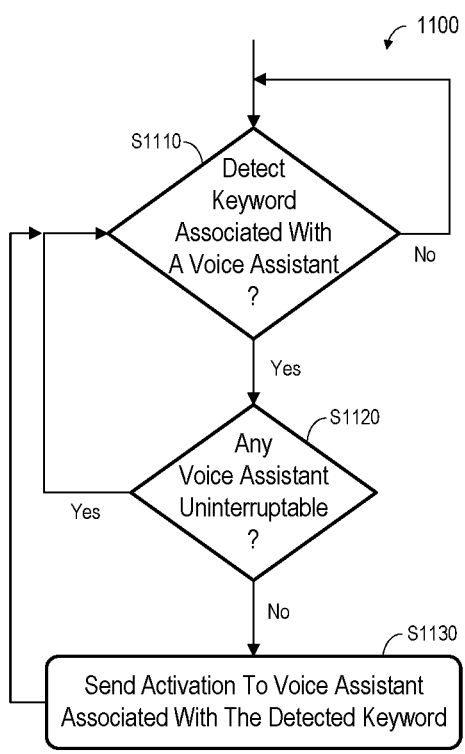
FIG. 11 is a flow diagram of a process to manage voice assistant activation on a multi-voice assistant platform according to some embodiments.

FIG. 11 is a flow diagram of process 1100 according to some embodiments. Process 1100 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Embodiments are not limited to the examples described below.

Process 1100 may be performed by an activation server such as activation server 110 of platform 100 but embodiments are not limited thereto. Process 1100 may be performed by a platform supporting two or more voice assistants.

Flow cycles at S1110 until a keyword associated with a voice assistant is detected. One or more of the voice assistants of a platform executing process 1100 may be associated with two or more keywords. Detection of a keyword at S1110 may comprise receiving a keyword detection signal from another component of the platform. Keyword detection at S1110 may comprise receiving an audio signal (e.g., via passive monitoring of the ambient audio environment), and determining that the received audio signal represents a keyword associated with a voice assistant registered to the platform. The determination may comprise speech-to-text processing on the audio signal and comparison of the resulting text to a list of keywords associated with registered voice assistants.

Flow proceeds to S1120 from S1110 once a keyword associated with a voice assistant is detected. At S1120, it is determined whether any registered voice assistant is currently uninterruptable. As described above, a previously-activated voice assistant may indicate itself as uninterruptable, for example, using an API exposed by the activation server. This indication may be stored and used in the determination at S1120.

According to some embodiments, the determination of uninterruptability of a voice assistant is based on a state of the voice assistant. For example, a voice assistant may be in an inactive state or an active state. The active state may include states such as talking, listening, and thinking. At S1120, it may be determined that a voice assistant of the platform is uninterruptable because a voice assistant is in the "thinking" active state.

The determination at S1120 may be based on any suitable combination of voice assistant state information and/or uninterruptability flags.

If it is determined at S1120 that any currently-registered voice assistant is uninterruptable, no activation is transmitted in response to the detected keyword and flow returns to S1110 to await detection of a keyword as described above.

Flow proceeds from S1120 to S1130 if it is determined that no registered voice assistant is uninterruptable. At S1130, an activation is sent to the voice assistant associated with the detected keyword. Flow then returns to S1110 to await detection of a keyword. In the meantime, the voice assistant receiving the activation may activate and begin a dialog session with a user. As described above, this voice assistant may also indicate that it is uninterruptable for the purpose of any subsequent determination at S1120.

Figure 12:
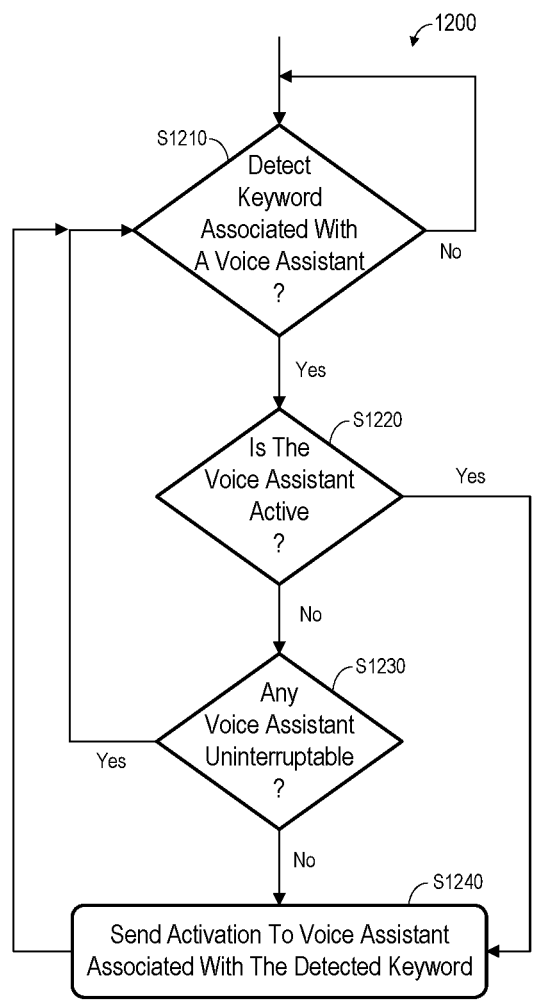
FIG. 12 is a flow diagram of a process to manage voice assistant activation on a multi-voice assistant platform according to some embodiments.

FIG. 12 illustrates alternative process 1200 which may be performed by an activation server of a multi-voice assistant platform. Process 1200 may be performed to manage activation of voice assistants based on received keywords.

Initially, at S1210, it is determined whether a keyword associated with a registered voice assistant has been detected. Flow cycles at S1210 until such a keyword is detected. As mentioned above, detection of a keyword may, for example, comprise receiving a keyword detection signal from another component of the platform, or receiving an audio signal and determining that the received audio signal represents a keyword associated with a voice assistant registered to the platform.

Once a keyword associated with a voice assistant is detected, it is determined at S1220 whether the associated voice assistant is active. This determination may be based on a reported and monitored state of the associated voice assistant. If the associated voice assistant is not active, flow proceeds to S1230 to determine whether any voice assistant of the platform is currently marked as uninterruptable.

The evaluation of uninterruptability of a voice assistant may be based on whether a flag is currently set indicating that a voice assistant is uninterruptable. Such a flag may be set in response to an indication of uninterruptability previously received from a voice assistant. The determination of uninteruptability may be also or alternatively based on current states of the voice assistants. According to some embodiments, a voice assistant which has marked itself as uninterruptable but then becomes inactive is no longer considered uninterruptable. In some embodiments, a voice assistant is required to indicate that it is interruptable prior to going inactive.

If it is determined at S1230 that no registered voice assistant is uninterruptable, an activation is sent to the voice assistant associated with the detected keyword. The voice assistant then activates and enters a dialog session as is known in the art. The activated voice assistant may indicate itself as uninterruptable during the dialog session. In the meantime, flow returns to S1210 to await detection of a keyword.

Returning to S1220, if the voice assistant associated with the detected keyword is active, flow proceeds to S1240 to send an activation to the voice assistant. Such an action allows the voice assistant to determine whether to interrupt its current dialog session based on the detection of its own keyword, whether or not it has marked itself as uninterruptable.

Embodiments may support any other desired logic for interrupting or not interrupting active voice assistants in response to detection of their associated keyword or keywords associated with other voice assistants.

Figure 13:
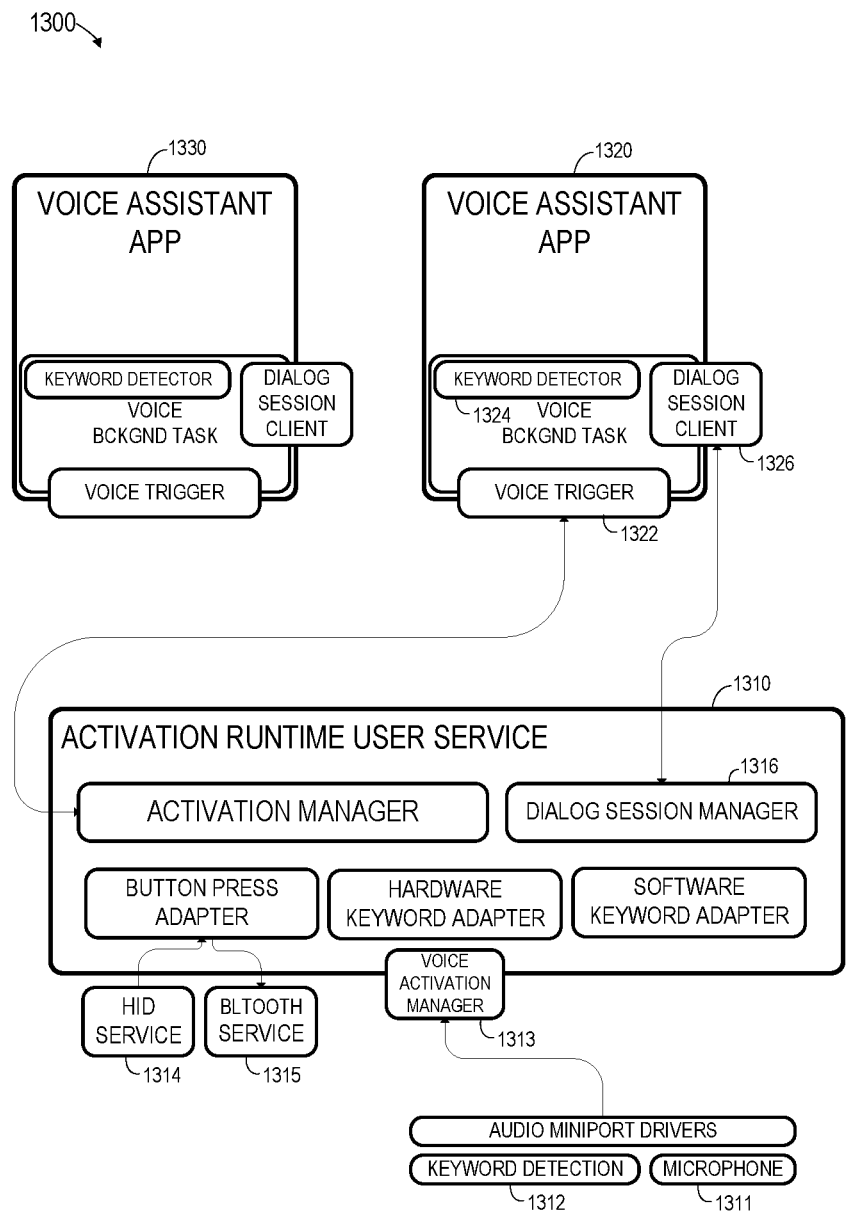
FIG. 13 is a block diagram of software components of a multi-voice assistant platform according to some embodiments.

FIG. 13 illustrates software architecture 1300 of a computing system implementing an embodiment. Such an embodiment may include software components other than those illustrated in FIG. 13. Software architecture 1300 may be implemented by any suitable computing platform, including, for example, a personal computer, a smartphone, and Internet of Things edge devices executing an operating system such as a smart speaker. Software architecture 1300, or portions thereof, may be implemented within an embedded system. One or more components of software architecture 1300 may be deployed by a virtual machine of a cloud-based server. Each component of software architecture 1300 may be implemented by executable code.

Activation runtime user service 1310 may comprise an operating system component. Activation runtime user service 1310 is responsible for activating voice assistant applications registered within software architecture 1300 when an activation event is detected.

For example, microphone 1311 may receive audio signals and keyword detection component 1312 may detect registered voice keywords represented within the audio signals. The detection surfaces to activation runtime user service 1310 through voice activation manager 1313.

Activation runtime user service 1310 may detect other activation events such as a button press via Human Interface Device service 1314. An activation event received over Bluetooth may also surface as a button press through Bluetooth service 1315. Any suitable logic may be implemented to determine whether to send an activation to a voice assistant application based on a button press activation event. In some embodiments, activation runtime user service 1310 sends an activation to a corresponding voice assistant in response to a received button press activation event regardless of the active or inactive state of any active voice assistant or whether any voice assistant has been marked as uninterruptable. Such embodiments are intended to reflect user intent, in view of the degree of intention which may be inferred by a button press.

According to some embodiments, dialog session manager 1316 may execute process 1100 or process 1200 to determine whether to send an activation to a voice assistant application based on a received activation event. In the present example, it is assumed that a voice keyword associated with voice assistant application 1320 is received at a time when neither voice assistant application 1320 nor voice assistant application 1330 is activated. Activation manager 1317 therefore sends an activation to voice assistant application 1320 to activate voice trigger 1322, which is a background task associated with voice assistant application 1320.

In response to activation of voice trigger 1322, voice assistant application 1320 verifies that its keyword has been received. In this regard, voice assistant application 1320 includes assistant-specific keyword detector 1324. Assistant-specific keyword detector 1324 performs a verification pass on the received activation to confirm the utterance of its associated keyword. Such a verification pass may allow detection component 1312 to implement a less robust detection model than would otherwise be required, thereby conserving platform resources.

Dialog session client 1326 is created if the verification pass is successful. Dialog session client 1326 may then provide its state and interruptability information to dialog session manager 1316. For example, dialog session client 1326 may indicate that it is active, listening and uninterruptable. Dialog session manager 1316 maintains a record of this information.

Accordingly, upon receiving another keyword detection, dialog session manager 1316 may determine whether to send an activation to an associated voice assistant application based on the state and/or uninterruptability information of all the voice assistant applications of software architecture 1300. This determination may follow the logic described above with respect to processes 1100 and 1200, and or any other suitable logic. If an active voice assistant does not mark itself as interruptable (e.g., via communication between dialog session client 1326 and dialog session manager 1316), it may be determined to simply send an activation to a corresponding voice assistant whenever a keyword is detected.

Figure 14:
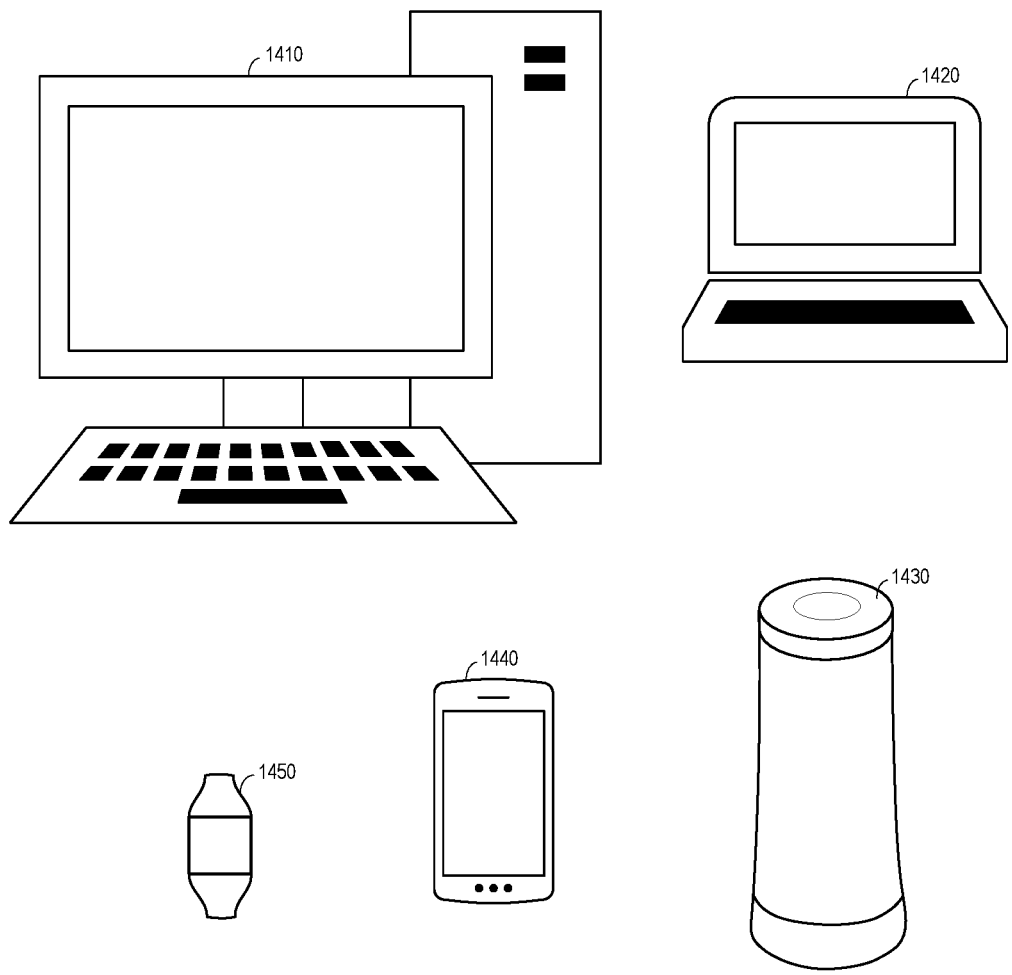
FIG. 14 illustrates devices which may support a multi-voice assistant platform according to some embodiments.

FIG. 14 illustrates computing devices which may implement a system according to some embodiments. The computing devices of FIG. 14 do not comprise a non-exhaustive collection of systems in which embodiments may be implemented.

Each of devices 1410 through 1450 may execute an operating system including an activation manager as described above. The operating system may also allow for the registration of more than one voice assistant application. Personal computer 1410 and laptop computer 1420 may execute desktop operating systems, while smartphone 1440 and smartwatch 1450 may execute mobile operating systems. Smart speaker 1430 may execute a mobile operating system or a dedicated smart device operating system. Again, embodiments are not limited to these descriptions.

Figure 15:
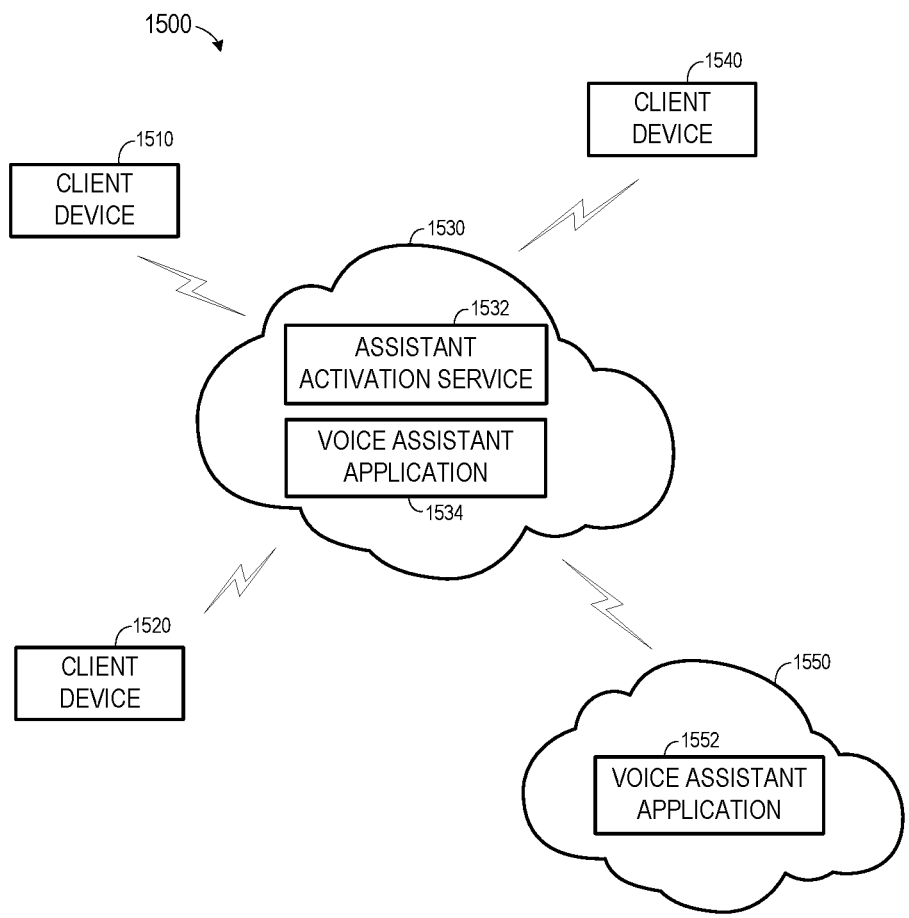
FIG. 15 is a block diagram of a cloud computing system supporting multiple voice assistants according to some embodiments.

FIG. 15 illustrates distributed system 1500 according to some embodiments. Distributed system 1500 may provide multi-voice assistant functionality to devices which do not have such functionality on-board. The cloud-based components of system 1500 may be implemented using on-demand virtual machines, virtual servers and cloud storage instances.

According to the FIG. 15 example, client devices 1510 and 1520 may selectively connect to cloud services 1530 to transmit detected keywords thereto. In some embodiments, one or both of client devices 1510 and 1520 send all received audio signals to cloud services 1530 in order to receive voice assistant services based on any keywords which happen to be present in the received audio signals.

Assistant activation service 1532 may be implemented as a cloud service providing activation of voice assistant applications based on received audio signals or keyword detection events. Cloud service 1532 may include voice assistant application 1534 which may be activated by assistant activation service 1532. Cloud service 1550, which may be operated by a service provider different from the service provider operating cloud services 1530, may provide voice assistant application 1552. Voice assistant application 1552 may also be activated by assistant activation service 1532 based on signals received from client devices 1510 and/or 1520.

Each of voice assistant application 1534 and voice assistant application 1552 may communicate with assistant activation service 1532 to mark itself as interruptable. Accordingly, assistant activation service 1532 may operate as described herein to selectively determine whether to send an activation to either of voice assistant application 1534 and voice assistant application 1552.

Figure 16:
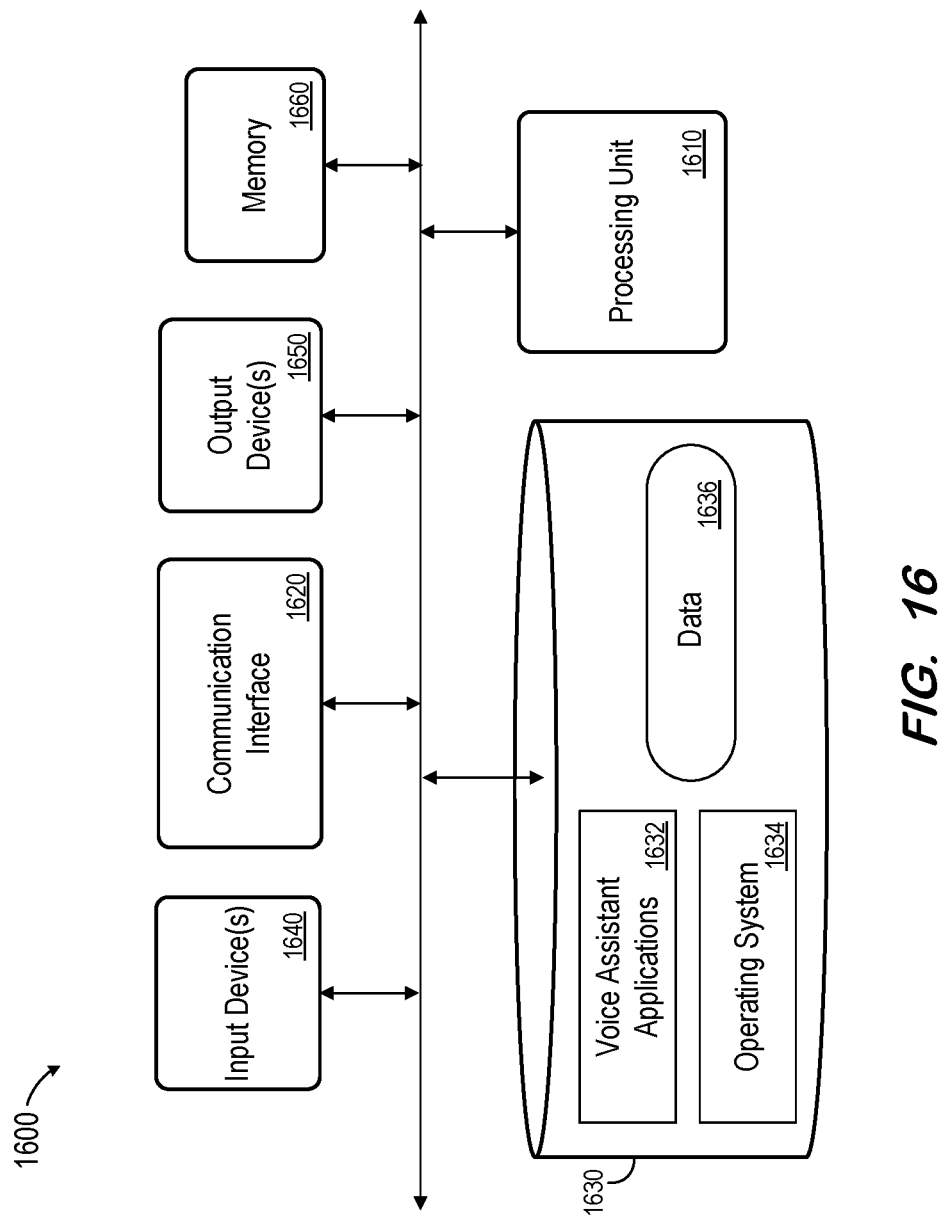
FIG. 16 is a block diagram of a computing system implementing a multi-voice assistant platform according to some embodiments.

FIG. 16 is a block diagram of system 1600 according to some embodiments. System 1600 may comprise any suitable computing system and may execute program code to provide voice assistants as described herein.

System 1600 includes processing unit 1610 operatively coupled to communication device 1620, persistent data storage system 1630, one or more input devices 1640, one or more output devices 1650 and volatile memory 1660. Processing unit 1610 may comprise one or more processors, processing cores, etc. for executing program code. Communication interface 1620 may facilitate communication with external networks. Input device(s) 1640 may comprise, for example, a keyboard, a keypad, a mouse or other pointing device, a microphone, a touch screen, and/or an eye-tracking device. Output device(s) 1650 may comprise, for example, a display and/or a speaker.

Data storage system 1630 may comprise any number of appropriate persistent storage devices, including combinations of magnetic storage devices (e.g., magnetic tape, hard disk drives and flash memory), optical storage devices, Read Only Memory (ROM) devices, etc. Memory 1660 may comprise Random Access Memory (RAM), Storage Class Memory (SCM) or any other fast-access memory.

Voice assistant applications 1632 may comprise program code executed by processing unit 1610 to cause system 1600 to execute dialog sessions with users. Each of voice assistant applications 1632 is associated with a voice keyword used for its activation as described herein. Operating system 1634 includes operating system components as is known in the art, and may also include an activation service to selectively activate voice assistant applications 1632 as described herein. Data 1636 may include any data used by any systems or applications of system 1600. Such data may include session state information and/or uninterruptable flags as described herein.

Each functional component described herein may be implemented at least in part in computer hardware, in program code and/or in one or more computing systems executing such program code as is known in the art. Such a computing system may include one or more processing units which execute processor-executable program code stored in a memory system.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Those in the art will appreciate that various adaptations and modifications of the above-described embodiments can be configured without departing from the claims. Therefore, it is to be understood that the claims may be practiced other than as specifically described herein.

What is claimed is:

1. A computing system comprising one or more processors to execute processor-executable program code stored on a non-transitory medium to cause the computing system to:
   execute a plurality of voice assistant applications, a first voice assistant application of the plurality of voice assistant applications associated with a first voice keyword and a second voice assistant application of the plurality of voice assistant applications associated with a second voice keyword;
   receive first audio signals representing the first voice keyword;
   in response to reception of the first audio signals, transmit an activation signal to the first voice assistant application to activate the first voice assistant application and execute a first user dialog session;
   while the first voice assistant application is active and executing the first user dialog session:
      receive a signal from the first voice assistant application indicating that the first voice assistant application is uninterruptable;
      receive second audio signals representing the second voice keyword;
      in response to reception of the second audio signals, determine that the first voice assistant application is uninterruptable and do not transmit an activation signal to the second voice assistant application;
      receive a second signal from the first voice assistant application indicating that the first voice assistant application is interruptable;
      receive third audio signals representing the second voice keyword; and
      in response to reception of the third audio signals, determine that the first voice assistant application is interruptable and transmit an activation signal to the second voice assistant application to activate the second voice assistant application and execute a second user dialog session.

2. A computing system according to claim 1, comprising one or more processing units to execute processor-executable program code to cause the computing system to:
   while the second voice assistant application is active and executing the second user dialog session:
      receive a third signal from the second voice assistant application indicating that the second voice assistant application is uninterruptable;
      receive fourth audio signals representing the first voice keyword;
      in response to reception of the fourth audio signals, determine that the second voice assistant application is uninterruptable and determine to not transmit an activation signal to the first voice assistant application;
      receive a fourth signal from the second voice assistant application indicating that the second voice assistant application is interruptable;
      receive fifth audio signals representing the first voice keyword; and
      in response to reception of the fifth audio signals, determine that the second voice assistant application is interruptable and transmit an activation signal to the first voice assistant application to activate the first voice assistant application and execute a third user dialog session.

3. A method for a computing device providing a plurality of voice assistant applications, a first voice assistant application of the plurality of voice assistant applications associated with a respective first voice keyword and a second voice assistant application of the plurality of voice assistant applications associated with a second voice keyword, the method comprising:
   receiving first audio signals representing the first voice keyword;
   in response to receiving the first audio signals, transmitting an activation signal to the first voice assistant application to activate the first voice assistant application and execute a first user dialog session;
   while the first voice assistant application is active and executing the first user dialog session:
      receiving a signal from the first voice assistant application indicating that the first voice assistant application is uninterruptable;
      receiving second audio signals representing the second voice keyword;
      in response to reception of the second audio signals, determining that the first voice assistant application is uninterruptable and do not transmit an activation signal to the second voice assistant application;
      receiving a second signal from the first voice assistant application indicating that the first voice assistant application is interruptable;
      receiving third audio signals representing the second voice keyword; and
      in response to receiving the third audio signals, determining that the first voice assistant application is interruptable and transmitting an activation signal to the second voice assistant application to activate the second voice assistant application and execute a second user dialog session.

4. A method according to claim 3, further comprising:
   while the second voice assistant application is active and executing the second user dialog session:
      receiving a third signal from the second voice assistant application indicating that the second voice assistant application is uninterruptable;
      receiving fourth audio signals representing the first voice keyword;
      in response to reception of the fourth audio signals, determine that the second voice assistant application is uninterruptable and determine to not transmit an activation signal to the first voice assistant application;
      receive a fourth signal from the second voice assistant application indicating that the second voice assistant application is interruptable;
      receive fifth audio signals representing the first voice keyword; and
      in response to reception of the fifth audio signals, determine that the second voice assistant application is interruptable and transmit an activation signal to the first voice assistant application to activate the first voice assistant application and execute a third user dialog session.

5. A system comprising:
   a plurality of voice assistant applications executed by at least a processor, a first voice assistant application of the plurality of voice assistant applications associated with a first voice keyword and a second voice assistant application of the plurality of voice assistant applications associated with a second voice keyword;
a voice assistant activation component executed by at least the processor to:
  detect a first user utterance representing the first voice keyword;
  in response to detection of the first user utterance, transmit an activation signal to the first voice assistant application to activate the first voice assistant application and execute a first user dialog session;
  while the first voice assistant application is active and executing the first user dialog session:
    receive a signal from the first voice assistant application indicating that the first voice assistant application is uninterruptable;
    receive a second user utterance representing the second voice keyword;
    in response to reception of the second user utterance, determine that the first voice assistant application is uninterruptable and do not transmit an activation signal to the second voice assistant application;
    receive a second signal from the first voice assistant application indicating that the first voice assistant application is interruptable;
    receive a third user utterance representing the second voice keyword; and
    in response to reception of the third user utterance, determine that the first voice assistant application is interruptable and transmit an activation signal to the second voice assistant application to activate the second voice assistant application and execute a second user dialog session.

6. A system according to claim 5, the voice assistant activation component to:
  while the second voice assistant application is active and executing the second user dialog session:
    receive a third signal from the second voice assistant application indicating that the second voice assistant application is uninterruptable;
    receive a fourth user utterance representing the first voice keyword;
    in response to reception of the fourth user utterance, determine that the second voice assistant application is uninterruptable and determine to not transmit an activation signal to the first voice assistant application;
    receive a fourth signal from the second voice assistant application indicating that the second voice assistant application is interruptable;
    receive a fifth user utterance representing the first voice keyword; and
    in response to reception of the fifth user utterance, determine that the second voice assistant application is interruptable and transmit an activation signal to the first voice assistant application to activate the first voice assistant application and execute a third user dialog session.

* * * * *